(12) United States Patent
Fukuoka

(10) Patent No.: US 6,854,592 B2
(45) Date of Patent: Feb. 15, 2005

(54) CONVEYING APPARATUS

(75) Inventor: Mitsuhiro Fukuoka, Chiryu (JP)

(73) Assignee: Watanabe Machinery Mfg. Co., Ltd. (JP)

( * ) Notice: Subject to any disclaimer, the term of this patent is extended or adjusted under 35 U.S.C. 154(b) by 0 days.

(21) Appl. No.: 10/647,802

(22) Filed: Aug. 25, 2003

(65) Prior Publication Data
US 2004/0035684 A1 Feb. 26, 2004

(30) Foreign Application Priority Data
Aug. 26, 2002 (JP) ........................................ 2002-245101

(51) Int. Cl.⁷ ............................................. B65G 13/02
(52) U.S. Cl. ..................................... 198/788; 198/789
(58) Field of Search ........................... 198/780, 781.07, 198/788, 789, 782

(56) References Cited

U.S. PATENT DOCUMENTS

| | | | | |
|---|---|---|---|---|
| 3,980,170 A | * | 9/1976 | Jakes et al. .................. 198/782 |
| 4,781,286 A | * | 11/1988 | Weaver ........................ 198/789 |
| 5,452,790 A | * | 9/1995 | Morrell et al. ............... 198/782 |
| 5,462,156 A | * | 10/1995 | Kobayashi et al. .......... 198/788 |
| 5,918,728 A | * | 7/1999 | Syverson ..................... 198/788 |
| 2001/0027909 A1 | * | 10/2001 | Itoh et al. .................... 198/788 |

FOREIGN PATENT DOCUMENTS

| | | |
|---|---|---|
| JP | 3-110012 | 11/1991 |
| JP | 08-080089 | 3/1996 |
| JP | 11-301842 | 11/1999 |
| JP | 2000-344332 | 12/2000 |

* cited by examiner

Primary Examiner—James R. Bidwell
(74) Attorney, Agent, or Firm—Madson & Metcalf

(57) ABSTRACT

A roller conveyor has three-phase synchronous motors and feed rollers. The three-phase synchronous motors are operationally coupled to the respective feed rollers. The three-phase synchronous motors are driven by a three-phase AC voltage supplied from a three-phase AC power supply and the three-phase synchronous motors output a torque. Each feed roller is caused to roll to convey a work by the torque output from the corresponding three-phase synchronous motor. This structure provides an inexpensive roller conveyor which is easy to maintain.

17 Claims, 3 Drawing Sheets

CONVEYING APPARATUS

BACKGROUND OF THE INVENTION

The present invention relates to a conveying apparatus.

A roller conveyor, which is one kind of conveying apparatus, has a plurality of feed rollers. A conventional roller conveyor has an induction motor connected to each of the feed rollers. In general, a speed reducer is intervened between each feed roller and the induction motor. The speed reducer however enlarges the roller conveyor. As a solution to this shortcoming, there is a proposal to replace the induction motor with a two-phase synchronous motor. The two-phase synchronous motor supplies each feed roller with a low-speed and high torque without a speed reducer.

The two-phase synchronous motor is driven by two single-phase AC voltages, the first single-phase AC voltage and the second single-phase AC voltage, supplied from a single-phase AC power supply. The second single-phase AC voltage is acquired by shifting the phase of the first single-phase AC voltage by 90° by a capacitor. The capacitor however requires regular maintenance and brings about an increase in the cost of the roller conveyor.

SUMMARY OF THE INVENTION

Accordingly, it is an object of the present invention to provide an inexpensive conveying apparatus that is easy to maintain.

To achieve the foregoing and other objectives, and in accordance with the purpose of the present invention, a conveying apparatus for conveying a work is provided. The conveying apparatus has a three-phase synchronous motor and a conveyor body. The three-phase synchronous motor is electrically connected to a three-phase AC power supply and is driven to output power by a three-phase AC voltage output from the three-phase AC power supply. The conveyor body is operationally coupled to the three-phase synchronous motor and operates to convey the work with the power output from the three-phase synchronous motor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The first embodiment of the present invention will be described below.

Figure 1:
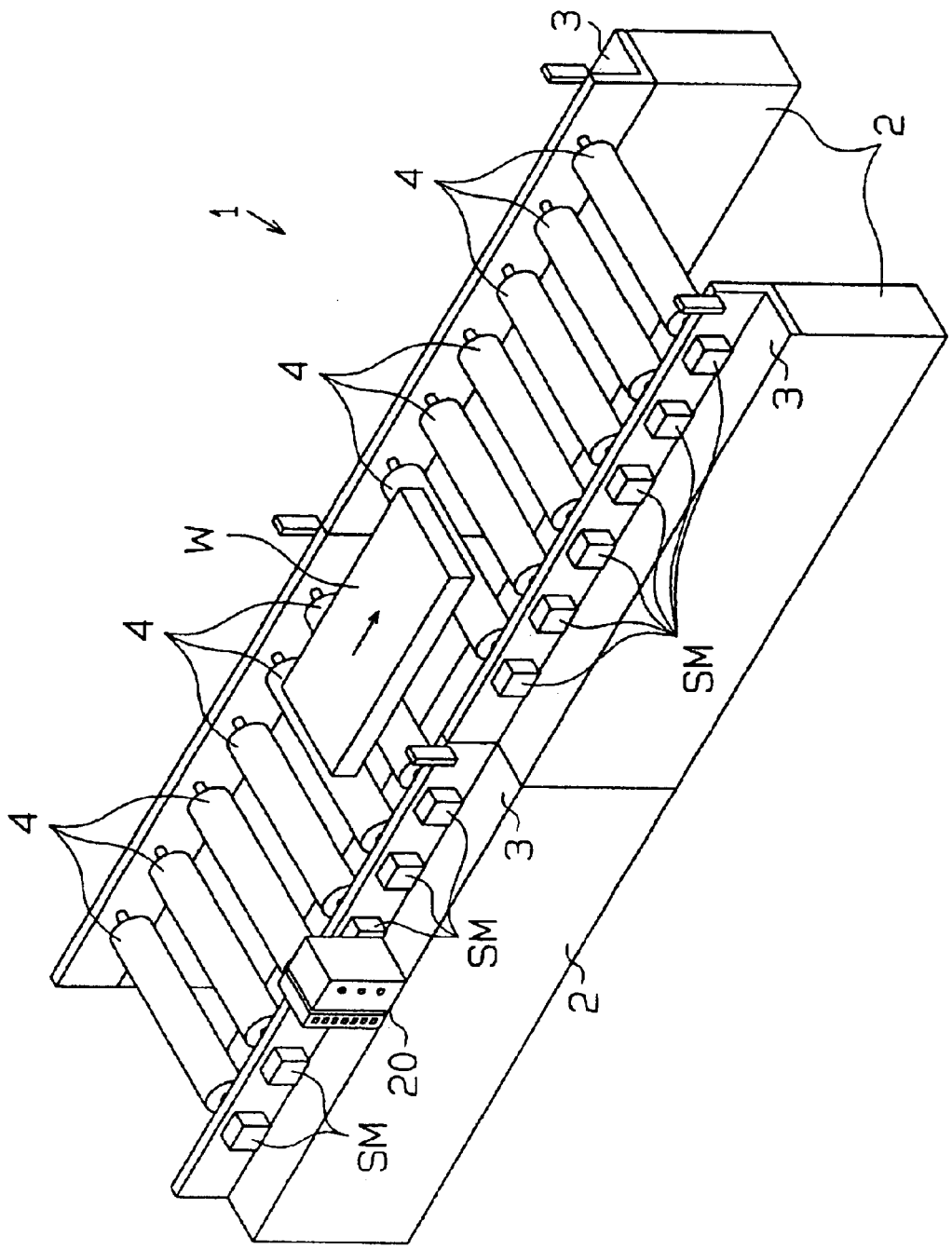
FIG. 1 is a perspective view illustrating a conveying apparatus according to a first embodiment of the present invention.

FIG. 1 shows a roller conveyor 1 or a conveying apparatus according to the first embodiment of the present invention. In the roller conveyor 1, frames 3 each having an L-shaped cross section are respectively secured on a pair of bases 2 extending parallel to each other. A plurality of feed rollers 4, which are conveyor bodies, is laid out between both frames 3 at predetermined pitches. Each feed roller 4 is rotatably supported to both frames 3. The individual feed rollers 4 are directly coupled to respective synchronous motors SM in an operational manner and roll to convey a work W by the power output from the synchronous motors SM. The synchronous motors SM are attached to one of the frames 3. A control box 20 is further attached to that frame 3.

Figure 2:
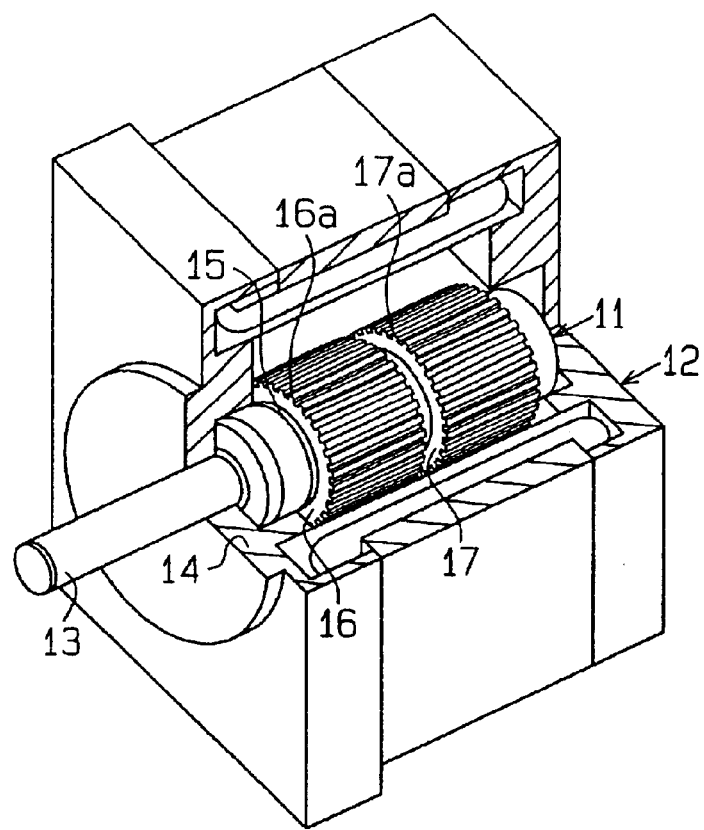
FIG. 2 is a partly cut-away perspective view showing a synchronous motor that is mounted in the conveying apparatus.
Figure 3:
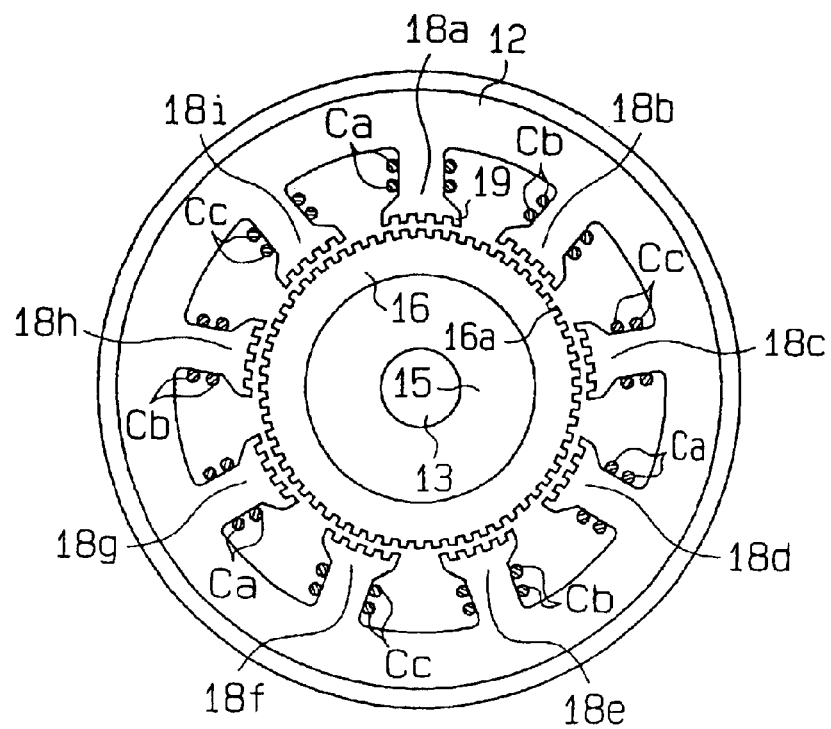
FIG. 3 is a cross-sectional view showing the synchronous motor in FIG. 2.

The structure of the synchronous motors SM will be discussed referring to FIGS. 2 and 3.

The synchronous motor SM has a rotor 11 and a stator 12. The shaft, 13, of the rotor 11 is supported on a housing 14 in a rotatable manner. Each feed roller 4 is operationally coupled to that portion of the corresponding shaft 13 which is positioned outside the housing 14.

A magnet 15 is secured to that portion of the shaft 13 which is located inside the housing 14. A pair of core portions 16 and 17 is provided on the outer surface of the magnet 15. The core portions 16 and 17 are each comprised of a laminated steel plate and are laid along the axial line of the shaft 13. A plurality of projecting electrodes 16a is provided at equiangular distances on the outer surface of the core portion 16. A plurality of projecting electrodes 17a is provided at equiangular distances on the outer surface of the core portion 17. The projecting electrodes 16a and 17a extend in the axial direction of the shaft 13. The pitch between the adjoining projecting electrodes 16a is equal to the pitch between the adjoining projecting electrodes 17a. Each of the projecting electrodes 16a corresponds to one of the projecting electrodes 17a. Each of the projecting electrodes 16a is shifted by half the pitch from the corresponding projecting electrode 17a with respect to the peripheral direction of the shaft 13.

The stator 12 has nine teeth 18a to 18i laid out at equiangular distances. Each of the teeth 18a to 18i protrudes toward the rotational center of the rotor 11 and extends over both core portions 16 and 17. A plurality of projecting electrodes 19 is provided on the distal end face of each of the teeth 18a to 18i. The projecting electrodes 19 extend in parallel to the projecting electrodes 16a and 17a. The teeth 18a to 18i are separated into three first teeth 18a, 18d, and 18g; three second teeth 18b, 18e, and 18h; and three third teeth 18c, 18f, and 18i. The three teeth included in each of the first to third teeth groups are laid with two different teeth in between the adjoining teeth along the peripheral direction of the rotor 11.

A single excitation coil is wound around each of the first teeth 18a, 18d, and 18g, and those three excitation coils are electrically connected together to constitute a single first excitation coil Ca. As the electricity is supplied to the first excitation coil Ca, the first teeth 18a, 18d, and 18g are excited. Likewise, a single excitation coil is wound around each of the second teeth 18b, 18e, and 18h and those three excitation coils are electrically connected together to constitute a single second excitation coil Cb. As the electricity is supplied to the second excitation coil Cb, the second teeth 18b, 18e, and 18h are excited. A single excitation coil is wound around each of the third teeth 18c, 18f, and 18i and those three excitation coils are electrically connected together to constitute a single third excitation coil Cc. As the electricity is supplied to the third excitation coil Cc, the third teeth 18c, 18f, and 18i are excited.

As the electricity is supplied to the first excitation coil Ca, the second excitation coil Cb, and the third excitation coil Cc in order, a magnetic interaction occurs between the projecting electrodes 19 of the excited teeth 18a to 18i and the projecting electrodes 16a and 17a of the core portions 16 and 17, causing the rotor 11 to rotate. Therefore, the synchronous motor SM functions as a three-phase synchronous motor.

The first excitation coil Ca, the second excitation coil Cb, and the third excitation coil Cc are connected to one another by a delta connection. Specifically, one end of the first excitation coil Ca is connected to one end of the second excitation coil Cb, the other end of the first excitation coil Ca is connected to one end of the third excitation coil Cc and the other end of the second excitation coil Cb is connected to the other end of the third excitation coil Cc. The node between the first excitation coil Ca and the second excitation coil Cb is connected to a first input terminal P1 (see FIG. 4). The node between the first excitation coil Ca and the third excitation coil Cc is connected to a second input terminal P2 (see FIG. 4). The node between the second excitation coil Cb and the third excitation coil Cc is connected to a third input terminal P3 (see FIG. 4).

Figure 4:
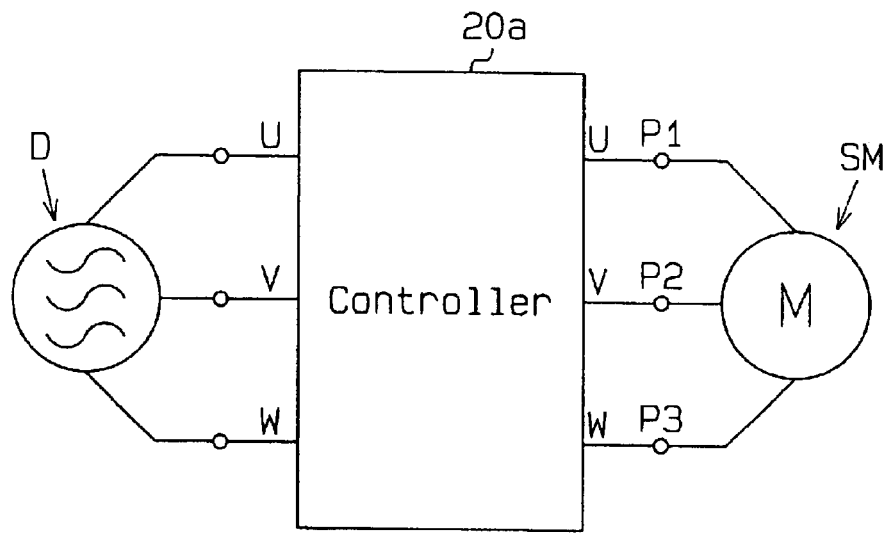
FIG. 4 is a circuit diagram showing the electric structure that drives the synchronous motor in FIG. 2.

As shown in FIG. 4, the synchronous motor SM is electrically connected to a three-phase AC power supply D via a controller 20a incorporated in the control box 20. The controller 20a performs the ON/OFF control of the supply of a three-phase AC voltage from the three-phase AC power supply D to the synchronous motor SM. The three-phase AC voltage supplied to the synchronous motor SM from the three-phase AC power supply D includes a U phase, V phase, and W phase each as a single-phase AC voltage. The U phase is supplied to the first excitation coil Ca via the first input terminal P1, the V phase is supplied to the second excitation coil Cb via the second input terminal P2, and the W phase is supplied to the third excitation coil Cc via the third input terminal P3.

Figure 5:
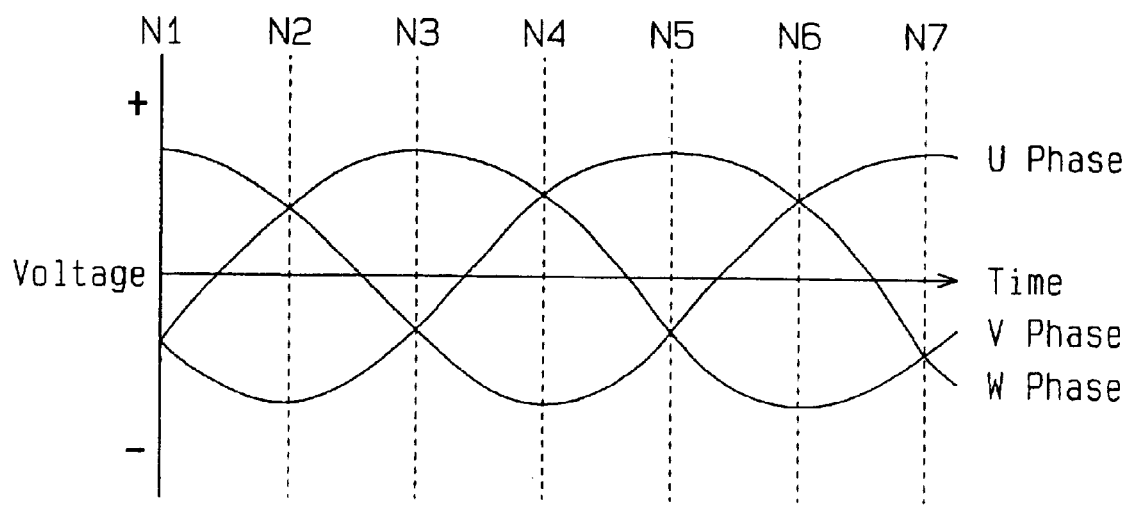
FIG. 5 is a diagram showing the waveform of a three-phase AC voltage to be supplied to the synchronous motor in FIG. 2.

As shown in FIG. 5, the U phase, V phase, and W phase are shifted from one another by 120 degrees. When a three-phase AC voltage is supplied to the synchronous motor SM, the first to third excitation coils Ca to Cc, which are supplied with the electricity, are switched from one to another in order at a given time period.

At a point indicated by N1 in FIG. 5, a positive voltage (U phase) is applied to the first input terminal P1, and negative voltages (V phase and W phase) are applied to the second input terminal P2 and the third input terminal P3. Then, the current flows in the first excitation coil Ca and the second excitation coil Cb, thereby exciting the first teeth 18a, 18d, and 18g and the second teeth 18b, 18e, and 18h. As a result, the rotor 11 rotates in such a way that the distance between each of the projecting electrodes 19 of the first teeth 18a, 18d, and 18g and the second teeth 18b, 18e, and 18h and one of the projecting electrodes 16a becomes the shortest.

At the next point indicated by N2 in FIG. 5, positive voltages (U phase and V phase) are applied to the first input terminal P1 and the second input terminal P2, and a negative voltage (W phase) is applied to the third input terminal P3. Then, the current flows in the second excitation coil Cb and the third excitation coil Cc, thereby exciting the second teeth 18b, 18e, and 18h and the third teeth 18c, 18f, and 18i. As a result, a magnetic interaction occurs between the projecting electrodes 19 of the second teeth 18b, 18e, and 18h and the third teeth 18c, 18f, and 18i and the projecting electrodes 16a of the core portion 16. This causes the rotor 11 to rotate by half the pitch of the projecting electrodes 16a and 17a in such a way that the distance between each of the projecting electrodes 19 of the second teeth 18b, 18e, and 18h and the third teeth 18c, 18f, and 18i and one of the projecting electrodes 17a of the core portion 17 becomes the shortest.

At the next point indicated by N3 in FIG. 5, a positive voltage (V phase) is applied to the second input terminal P2, and negative voltages (U phase and W phase) are applied to the first input terminal P1 and the third input terminal P3. Then, the current flows in the first excitation coil Ca and the third excitation coil Cc, thereby exciting the first teeth 18a, 18d, and 18g and the third teeth 18c, 18f, and 18i. As a result, a magnetic interaction occurs between each of the projecting electrodes 19 of the first teeth 18a, 18d, and 18g and the third teeth 18c, 18f, and 18i and the projecting electrodes 17a of the core portion 17. This causes the rotor 11 to further rotate by half the pitch of the projecting electrodes 16a and 17a in such a way that the distance between each of the projecting electrodes 19 of the first teeth 18a, 18d, and 18g and the third teeth 18c, 18f, and 18i and one of the projecting electrodes 16a of the core portion 16 becomes the shortest.

At a point indicated by N4 in FIG. 5, a current in the opposite direction to the current flowing at the point N1 flows in the first excitation coil Ca and the second excitation coil Cb. As a result, the rotor 11 further rotates by half the pitch of the projecting electrodes 16a and 17a.

At a point indicated by N5 in FIG. 5, a current in the opposite direction to the current flowing at the point N2 flows in the second excitation coil Cb and the third excitation coil Cc. As a result, the rotor 11 further rotates by half the pitch of the projecting electrodes 16a and 17a.

At a point indicated by N6 in FIG. 5, a current in the opposite direction to the current flowing at the point N3 flows in the first excitation coil Ca and the third excitation coil Cc. As a result, the rotor 11 further rotates by half the pitch of the projecting electrodes 16a and 17a.

At a point indicated by N7 in FIG. 5, a current in the same direction to the current flowing at the point N1 flows in the first excitation coil Ca and the second excitation coil Cb. As a result, the rotor 11 further rotates by half the pitch of the projecting electrodes 16a and 17a.

The synchronous motor SM to which the three-phase AC voltage is supplied repeats the process that has the points N1 to N7 as one period, causing the rotor 11 to rotate at a relatively low speed.

This embodiment provides the following advantages.

The synchronous motor SM does not require a capacitor needed in the motor of the conventional conveying apparatus. Therefore, the synchronous motor SM does not lead to a capacitor-oriented increase in the cost of the roller conveyor, nor does it make its maintenance a fatal issue.

The synchronous motor SM supplies the corresponding feed roller with a low-speed and high torque without a speed reducer, which is required in the conventional conveying apparatus. In other words, the synchronous motor SM does not require a speed reducer. This prevents the roller conveyor 1 from being enlarged by a speed reducer.

The synchronous motor SM is directly and operationally coupled to the corresponding feed roller 4. The torque output from the synchronous motor SM is therefore transmitted to the feed roller 4 without any loss. The amount of the current to be supplied to the synchronous motor SM for the feed roller 4 to do a predetermined amount of work can be relatively small. Even with a large distance between the frames 3, the feed roller 4 can rotate well.

Because each synchronous motor SM drives a single feed roller 4, the roller conveyor 1 has a good conveying characteristic.

It should be apparent to those skilled in the art that the present invention may be embodied in many other specific forms without departing from the spirit or scope of the invention. Particularly, it should be understood that the invention may be embodied in the following forms.

The frame 3 in FIG. 1 may be replaced with a frame having a cross-sectional shape different from an L shape. For example, the frame 3 may be replaced with a hollow frame having a rectangular cross section. The modification can allow the frames to house the synchronous motors SM as well as improve the strength of the roller conveyor 1. In the case where the synchronous motors SM are housed in the frames, the operational sounds of the synchronous motors SM are reduced.

Although a single synchronous motor SM drives a single feed roller 4 in the embodiment, a synchronous motor SM may drive a plurality of feed rollers 4. In this case, a pulley is attached to each feed roller 4 and a timing belt is put around the pulleys. The single synchronous motor SM is operationally coupled to one of the feed rollers 4 that are coupled together by the timing belt. This modification reduces the number of synchronous motors SM to be mounted on the roller conveyor 1.

Some of the synchronous motors SM may be omitted. For example, the synchronous motors SM may be provided only on every other feed roller 4. This modification also reduces the number of synchronous motors SM to be mounted on the roller conveyor 1.

The present invention may be embodied into other conveying apparatuses than the roller conveyor 1, such as a belt conveyor. In the case where the invention is adapted to a belt conveyor, the conveyor belt is equivalent to a conveyor body which operates on the power output from the synchronous motors SM.

The present examples and embodiments are to be considered as illustrative and not restrictive and the invention is not to be limited to the details given herein, but may be modified within the scope and equivalence of the appended claims.

What is claimed is:

1. A conveying apparatus for conveying a work, comprising:
    a three-phase synchronous motor which is electrically connected to a three-phase AC power supply and is driven to output power by a three-phase AC voltage output from said three-phase AC power supply; and
    a conveyor body which is operationally coupled to said three-phase synchronous motor and operates to convey said work with said power output from said three-phase synchronous motor,
    wherein said three-phase synchronous motor has a stator including a plurality of teeth laid at predetermined equiangular distances, a first excitation coil, a second excitation coil, and a third excitation coil; wherein each of said teeth has wound around it one of the first to third excitation coils; wherein each of a group of those teeth around which said first excitation coil is wound, each of a group of those teeth around which said second excitation coil is wound, and each of a group of those teeth around which said third excitation coil is wound are laid out with two of said teeth of other groups placed in between adjoining teeth of said each group; and wherein one of three single-phase AC voltages included in said three-phase AC voltage is supplied to each of said first to third excitation coils.

2. The conveying apparatus according to claim 1, wherein said first to third excitation coils are connected to one another by a delta connection.

3. The conveying apparatus according to claim 1, wherein a number of said teeth is a natural multiple of 3.

4. The conveying apparatus according to claim 1, wherein said three-phase synchronous motor is one of a plurality of three-phase synchronous motors, and said conveyor body is one of a plurality of feed rollers to which said three-phase synchronous motors are respectively coupled operationally.

5. The-conveying apparatus according to claim 1, wherein said three-phase synchronous motor is one of a plurality of three-phase synchronous motors, and said conveyor body comprises a plurality of feed rollers, wherein some of the feed rollers are respectively coupled operationally to said three-phase synchronous motors, and wherein the rest of the feed rollers are not coupled to any three-phase synchronous motor.

6. The conveying apparatus according to claim 1, wherein said conveyor body comprises a plurality of feed rollers and said power to be output from said three-phase synchronous motor is supplied to at least two of said feed rollers.

7. The conveying apparatus according to claim 1, wherein said conveyor body is directly coupled to said three-phase synchronous motor.

8. The conveying apparatus according to claim 1, wherein said conveyor body is coupled to said three-phase synchronous motor without a speed reducer.

9. The conveying apparatus according to claim 1, wherein said conveyor body is coupled to said three-phase synchronous motor such that torque output from the synchronous motor is transmitted to the conveyor body without loss of torque.

10. A conveying apparatus for conveying a work, comprising:
    a three-phase synchronous motor which is electrically connected to a three-phase AC power supply and is driven to output power by a three-phase AC voltage output from said three-phase AC power supply; and
    a conveyor body which is operationally coupled to said three-phase synchronous motor and operates to convey said work with said power output from said three-phase synchronous motor,
    wherein said conveyor body is coupled to said three-phase synchronous motor without a speed reducer.

11. The conveying apparatus according to claim 10, wherein said first to third excitation coils are connected to one another by a delta connection.

12. The conveying apparatus according to claim 10, wherein a number of said teeth is a natural multiple of 3.

13. The conveying apparatus according to claim 10, wherein said three-phase synchronous motor is one of a plurality of three-phase synchronous motors, and said conveyor body is one of a plurality of feed rollers to which said three-phase synchronous motors are respectively coupled operationally.

14. The-conveying apparatus according to claim 10, wherein said three-phase synchronous motor is one of a plurality of three-phase synchronous motors, and said conveyor body comprises a plurality of feed rollers, wherein some of the feed rollers are respectively coupled operationally to said three-phase synchronous motors, and wherein the rest of the feed rollers are not coupled to any three-phase synchronous motor.

15. The conveying apparatus according to claim 10, wherein said conveyor body comprises a plurality of feed rollers and said power to be output from said three-phase synchronous motor is supplied to at least two of said feed rollers.

16. The conveying apparatus according to claim 10, wherein said conveyor body is directly coupled to said three-phase synchronous motor.

17. The conveying apparatus according to claim 10, wherein said conveyor body is coupled to said three-phase synchronous motor such that torque output from the synchronous motor is transmitted to the conveyor body without loss of torque.

* * * * *